United States Patent
Bedell et al.

(10) Patent No.: US 7,263,762 B2
(45) Date of Patent: Sep. 4, 2007

(54) METHOD FOR REDUCING POLE HEIGHT LOSS IN THE FORMATION OF A WRITE POLE FOR A MAGNETIC WRITE HEAD

(75) Inventors: Daniel Bedell, Gilroy, CA (US); Jennifer A. Loo, Gilroy, CA (US); Aron Pentek, San Jose, CA (US); Murali Ramasubramanian, Fremont, CA (US)

(73) Assignee: Hitachi Global Storage Technologies, San Jose, CA (US)

( * ) Notice: Subject to any disclaimer, the term of this patent is extended or adjusted under 35 U.S.C. 154(b) by 419 days.

(21) Appl. No.: 10/957,038

(22) Filed: Sep. 30, 2004

(65) Prior Publication Data

US 2006/0070232 A1    Apr. 6, 2006

(51) Int. Cl.
*G11B 5/127* (2006.01)
*G11B 5/187* (2006.01)

(52) U.S. Cl. .............................. 29/603.01; 29/603.12; 29/603.13; 29/603.14; 29/603.15; 29/603.16; 29/603.18; 360/122

(58) Field of Classification Search ............. 29/603.01, 29/603.14, 603.13, 603.15, 603.12, 603.18, 29/603.16; 360/122, 328, 313, 316, 317; 216/22, 39; 427/127, 128, 130, 132; 438/672, 438/625, 627
See application file for complete search history.

(56) References Cited

U.S. PATENT DOCUMENTS

| | | | |
|---|---|---|---|
| 4,402,801 A | 9/1983 | Omata et al. | 204/15 |
| 5,314,596 A | 5/1994 | Shukovsky et al. | 204/192.2 |
| 5,802,700 A | 9/1998 | Chen et al. | 29/603.14 |
| 5,804,085 A | 9/1998 | Wu et al. | 216/22 |
| 5,875,542 A | 3/1999 | Tran et al. | 29/603.14 |
| 5,901,432 A | 5/1999 | Armstrong et al. | 29/603.14 |
| 6,218,283 B1 * | 4/2001 | Park et al. | 438/622 |
| 6,385,008 B1 * | 5/2002 | Santini et al. | 360/126 |
| 6,451,514 B1 * | 9/2002 | Iitsuka | 430/320 |
| 6,558,516 B1 * | 5/2003 | Kamijima | 204/192.2 |
| 2001/0022704 A1 | 9/2001 | Hong | 360/126 |

FOREIGN PATENT DOCUMENTS

| | | |
|---|---|---|
| JP | 63094423 | 4/1988 |
| JP | 1176089 | 7/1989 |
| JP | 3108111 | 5/1991 |
| JP | 11025422 | 1/1999 |

OTHER PUBLICATIONS

"Laminated Seed Layers for Plated Thin Film Heads and Structures"; IBM Technical Disclosure Bulletin; Jun. 1992; pp. 457-459.

* cited by examiner

*Primary Examiner*—A. Dexter Tugbang
*Assistant Examiner*—Tai Van Nguyen

(57) ABSTRACT

A method for reducing plated pole height loss in the formation of a write pole for a magnetic write head is disclosed. The method includes forming a conductive layer on a thin film substrate, forming a photoresist layer on the conductive layer and forming a trench in the photoresist layer. A thick seed layer is then placed on the trench and on the photoresist layer surface using a collimator. Moreover, the process includes plating while applying a voltage to the thin film substrate where the electrically isolated seed layer is removed and the trench is filled with plating material, removing the photoresist layer, and removing the exposed portions of the conductive layer on the thin film substrate.

22 Claims, 13 Drawing Sheets

METHOD FOR REDUCING POLE HEIGHT LOSS IN THE FORMATION OF A WRITE POLE FOR A MAGNETIC WRITE HEAD

FIELD OF THE INVENTION

Embodiments of the present invention relate generally to methods for forming a write pole for a magnetic write head. In particular, embodiments of the present invention relate to methods for reducing pole height loss in the formation of a write pole for a magnetic write head.

BACKGROUND OF THE INVENTION

Conventional magnetic data recording devices employ magnetic disk drives that include a magnetic storage media and a magnetic transducer referred to as a read/write head. The head is usually formed from a plurality of ferromagnetic structures that comprise materials such as nickel iron (NiFe) alloys for instance. The read/write head utilizes poles that are formed on opposite sides of the read/write head. In conventional read/write head arrangements, the poles are joined at one end of the read/write head that is referred to as the "yoke," and are separated by a gap at an opposite end of the read/write head that is referred to as the "tip". A wire coil that is wrapped around the poles near the magnetic disk provides a mechanism for driving magnetic flux from the read/write head.

In a conventional magnetic disk drive, data is written and read by a read/write head that is positioned adjacent to a magnetic platter or disk while the magnetic disk is rotated at high speed. The magnetic read/write head is mounted on a slider that positions the read/write head over a track on the surface of the magnetic disk where it is supported by an air cushion generated by the magnetic disk's high rotational speed. In order to increase the amount of data stored per unit of disk surface area more data must be written in narrower tracks on the disk surface.

Conventional read/write heads include a write pole that is employed to drive magnetic flux from the read/write head when data is written to a magnetic disk. In the fabrication of the write pole, a seed layer is employed. Optimal performance of the write pole in effecting the transfer of data to a magnetic disk is related in part to the thickness of the seed layer that is employed in the fabrication of the write pole.

With reference to FIG. 1 and FIG. 2, a current methodology used for forming a write pole includes: (1) the deposition of a seed layer 10 on a wafer 20; (2) the printing of a photoresist pattern 30 on the seed layer; (3) the cutting of a write pole trench into the photoresist; and (4) the plating of a write pole 40 in the trench. Subsequently, (5) the seed layer is removed everywhere but under the pole. FIGS. 1 and 2 respectively show cross sectional views of a wafer undergoing this process after the plating and seed layer removal steps. During the seed layer removal step, a portion 50 of the plated pole height is generally lost (see FIG. 2). The loss in pole height during the seed layer removal step may be about 1600 angstroms for an 800 angstrom seed layer. This level of pole height loss negatively impacts the performance capacity of the read/write head thus fabricated.

One possible solution to the above noted problem is to increase the thickness of the seed layer that is employed in the fabrication of the write pole since the high-moment seed used can improve read/write head performance. However, increasing the seed thickness means reducing the final pole height (because more seed thickness needs to be removed in the area that is not under the pole) or increasing the as plated pole height. Both of these conventional solutions would prove inadequate. Accordingly, a need exists for a method or process that facilitates the fabrication of a write pole of a desired height with an optimal seed layer thickness.

SUMMARY OF THE INVENTION

The present invention provides a method that accomplishes the above mentioned need.

For instance, one embodiment of the present invention provides a write pole fabricating process featuring the use of a high moment seed layer. Exemplary embodiments of the present invention facilitate a reduction in the amount of plated pole height (e.g., P2T) that is consumed in the pole fabricating process as seed layers that are to be removed are removed in concert with the formation of the write pole (e.g., in the plating bath that is used to plate the write pole). Consequently, the amount of P2T consumed for a given final seed thickness is reduced as conventional steps that result in the loss of P2T are eliminated. Additionally, a more efficient process is realized as the necessity for additional seed removal operations are eliminated from the write pole fabrication process.

In one embodiment, reducing plated pole height loss in the formation of a write pole for a magnetic write head is effected. The method includes forming a conductive layer on a thin film substrate, forming a photoresist layer on the conductive layer, and forming a trench in the photoresist layer. A thick high moment seed layer is then deposited inside the trench and also outside the trench on the photoresist layer. This is done with a collimator. Moreover, the novel method further includes plating while applying a voltage to the thin film substrate where the seed layer formed on the surface of the photoresist layer is removed and the trench is filled with plating material. The process also includes removing the photoresist layer, and removing exposed portions of the conductive layer that are formed on the thin film substrate. Since the thick seed is removed during the plating process that fabricates the pole, the pole is not substantially reduced. The electrically isolated seed layer does not plate and is removed.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3I shows the completed write pole according to one embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

METHOD FOR REDUCING POLE HEIGHT LOSS IN THE FORMATION OF A WRITE POLE ACCORDING TO ONE EMBODIMENT OF THE PRESENT INVENTION

FIGS. 3A-3F illustrate cross sections of a wafer undergoing a write pole fabricating process featuring the use of a high moment seed layer in accordance with one embodiment of the present invention. Exemplary embodiments of the present invention facilitate a reduction in the amount of plated pole height (e.g., P2T) that is consumed (e.g., wasted) in the write pole fabricating process as some of the deposited seed layers that are to be removed are removed in concert with the formation of the write pole (e.g., in the plating bath that is used to plate the write pole). Consequently, the amount of plated pole height consumed for a given final seed thickness is reduced as additional seed removal steps that may result in the loss of plated pole height are eliminated. Additionally, a more efficient process is realized as the necessity for additional seed removal operations are eliminated from the write pole fabrication process.

Figure 1:
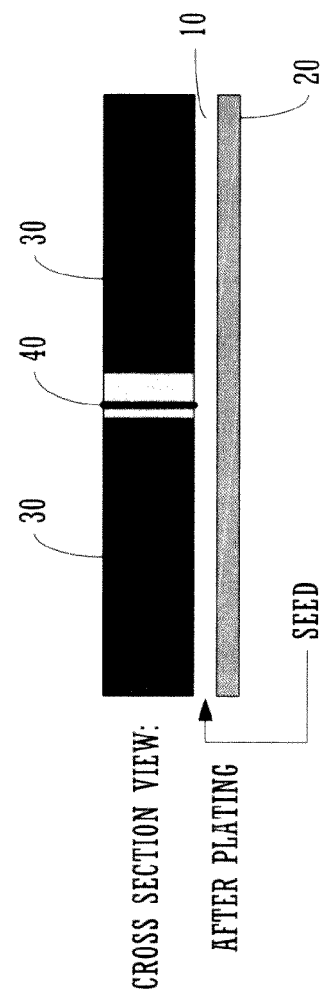
FIG. 1 shows a cross section view of a wafer at a point during a conventional write pole fabrication process after the plating step.
Figure 2:
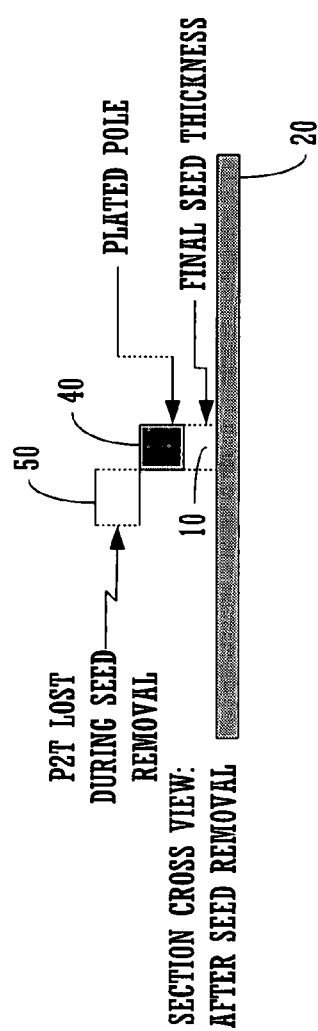
FIG. 2 shows a cross section view of a wafer at a point during a conventional write pole fabrication process after the seed layer removal step.
Figure 3A:
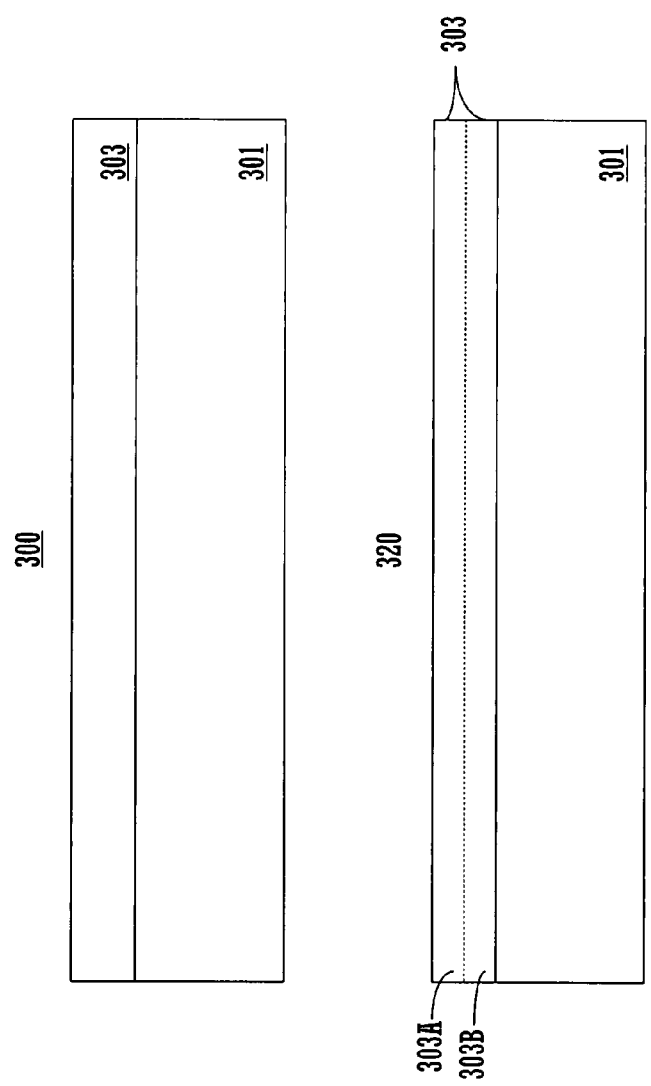
FIG. 3A illustrates a substrate with thin seed layer that are fabricated in a process for forming a write pole according to one embodiment of the present invention.

FIG. 3A illustrates wafer cross sections 300 and 320 resultant from operations that are performed in a process for forming a write pole according to one embodiment of the present invention. In FIG. 3A, wafer cross section 300, resultant from operations performed in accordance with one embodiment of the present invention, includes a substrate 301 covered with a conductive layer 303. According to one embodiment conductive layer 303 can include a thin seed layer and a non-magnetic metal gap layer (shown as 303A and 303B respectively in wafer cross section 320 which illustrates an embodiment that utilizes both thin seed and gap layers). In other embodiments, conductive layer 303 may include a conductive non-magnetic metal gap layer only. The conductive layer 303 may be formed by any process suitable for forming a conductive layer.

According to one embodiment, where a thin seed layer is employed, the thin seed layer may comprise a conductive magnetic layer. According to one embodiment, where a non-magnetic gap layer is employed, the non-magnetic gap layer may comprise a non-magnetic non-conductive layer. In another embodiment, where a non-magnetic gap layer is employed, the non-magnetic gap layer can comprise a non-magnetic conductive layer.

In one embodiment, conductive magnetic materials that may be used may include but are not limited to nickel iron, cobalt iron and cobalt nickel iron. In one embodiment, non-magnetic non-conductive materials that may be used may include but are not limited to oxides of aluminum and oxides of silicon such as aluminum oxide and silicon oxide. In one embodiment, conductive non-magnetic materials that may be used may include but are not limited to rhodium, gold, tantalum, and ruthenium.

Figure 3B:
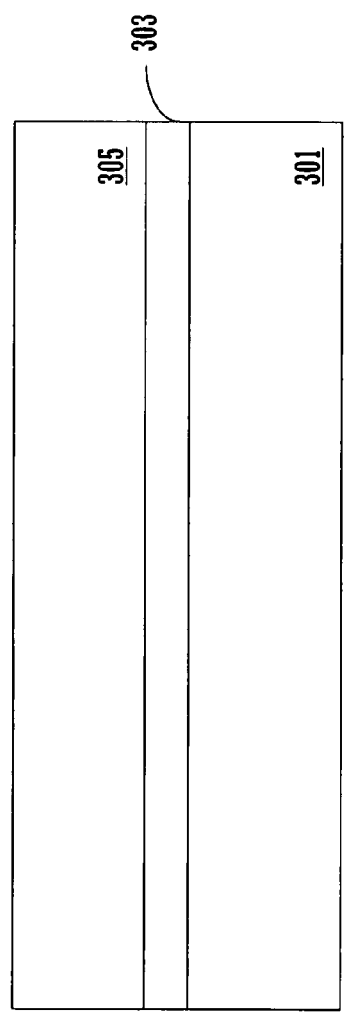
FIG. 3B illustrates a substrate, seed layer and photoresist fabricated in a process for forming a write pole according to one embodiment of the present invention.

FIG. 3B illustrates a wafer cross section resultant from operations that are performed in a process for forming a write pole according to one embodiment of the present invention. FIG. 3B shows in addition to the structures described with reference to FIG. 3A photoresist 305 applied to the conductive layer 303. According to one embodiment, a space (see trench 307 in FIG. 3C) may be formed in the photoresist 305 to help define the dimensions of the write pole. According to one embodiment, the photoresist layer 305 is formed above the surface of conductive layer 303.

Figure 3C:
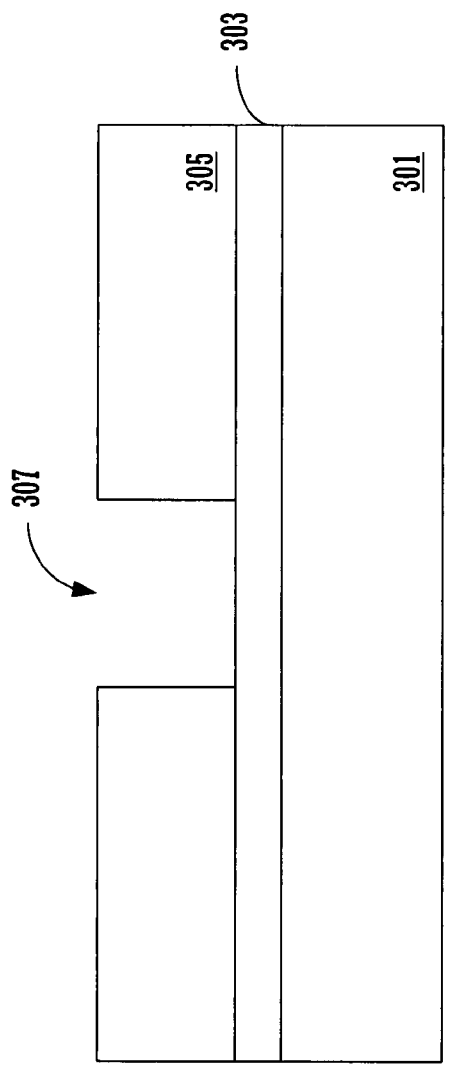
FIG. 3C illustrates the photoresist with a trench cut according to one embodiment of the present invention.

FIG. 3C illustrates a wafer cross section resultant from operations performed in a process for forming a write pole according to one embodiment of the present invention. FIG. 3C shows in addition to the structures described with reference to FIGS. 3A and 3B, trench 307 within the photoresist 305. According to one embodiment, trench 307 is formed by exposing at specified locations into the body of photoresist 305 using a mask. In alternate embodiments, trench 307 may be formed by other suitable processes for forming a trench (e.g. etching etc.). Trench 307 helps to define the dimensions of the write pole.

Figure 3D:
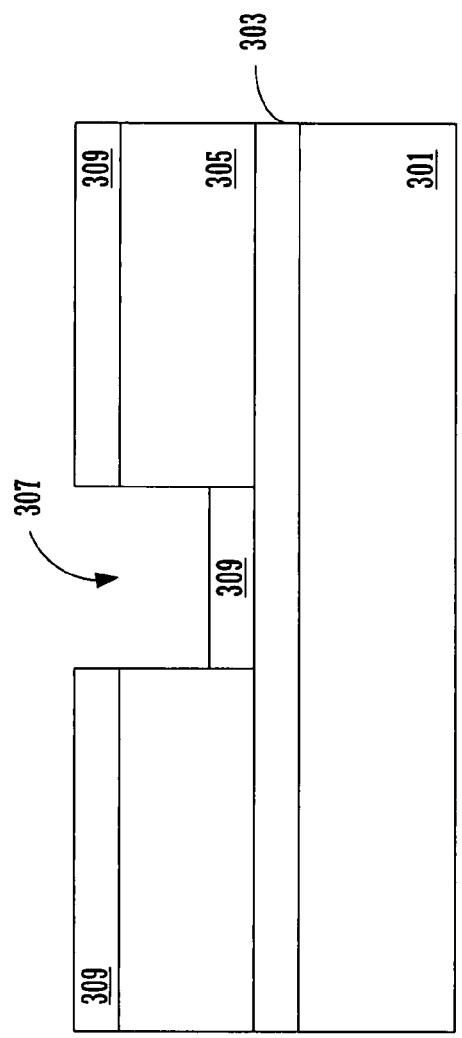
FIG. 3D illustrates a thick seed layer with high moment deposited using a collimator in a process for forming a write pole according to one embodiment of the present invention.

FIG. 3D illustrates a wafer cross section resultant from operations that are performed in a process for forming a write pole according to one embodiment of the present invention. FIG. 3D shows in addition to the structures described with reference to FIGS. 3A-3C, a thick high moment seed layer 309. According to one embodiment, seed layer 309 comprises a high moment seed layer that is formed using a collimator. In such embodiments, a collimator may be employed to allow collimated seed to be expelled from the collimator at an angle where it is deposited suitably (in an optimal manner) into the trench. More specifically, according to one embodiment, a collimator having a high aspect ratio (in terms of its length) which allows seed to move in a direction (perpendicular or substantially perpendicular to the bottom of the trench) that is optimal for satisfactory deposition of the seed onto the bottom of the trench 307 may be employed. In alternate embodiments, other suitable means of forming a seed layer 309 may be employed (e.g., deposition methods etc.). Thick seed layer 309 is placed in the trench 307 and on the surface of the photoresist 305.

Figure 3E:
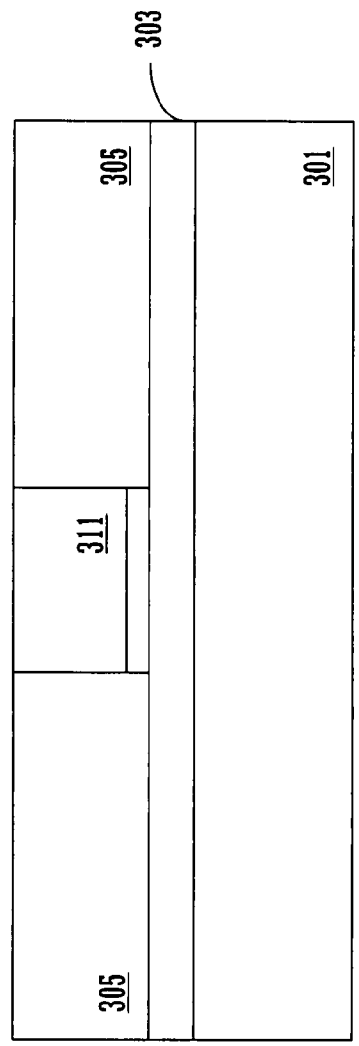
FIG. 3E illustrates a pole plated up with thick seed removal in a process for forming a write pole according to one embodiment of the present invention.
Figure 3F:
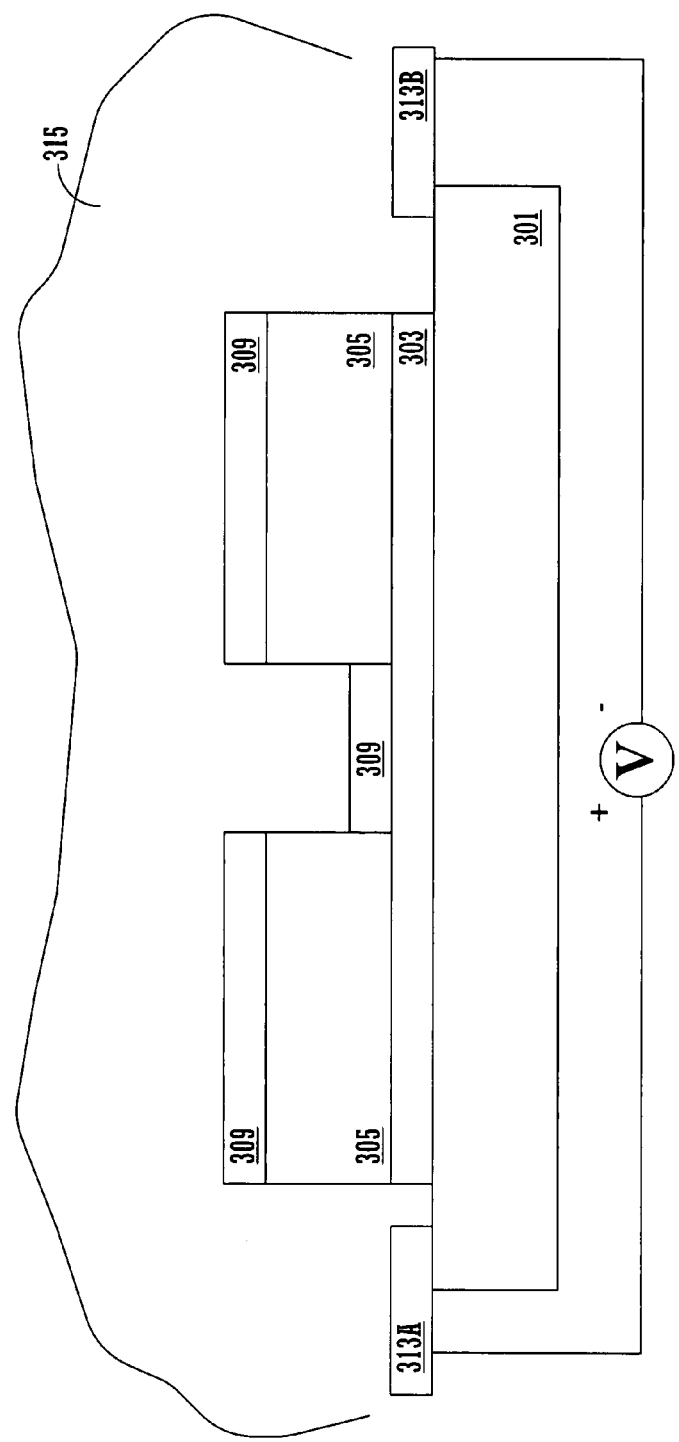
FIG. 3F illustrates the formation of a plated pole by immersing a wafer that includes the structures shown in FIG. 3D in a plating solution and applying a voltage to contacts located at the edges of the substrate.

FIG. 3E illustrates a wafer cross section resultant from operations that are performed in a process for forming a write pole according to one embodiment of the present invention. FIG. 3E shows in addition to the structures described with reference to FIGS. 3A-3D plated pole 311. According to one embodiment, plated pole 311 is formed by immersing a wafer that includes the structures shown in FIG. 3D in a plating solution 315 and applying a voltage to contacts 313A and 313B located at the edges of the substrate 301 as is shown in FIG. 3F. According to one embodiment, seed layer 309 on the surface of photoresist 305 is electrically isolated from the plating contacts and therefore does not plate. Moreover, since it is electrically isolated, it will be removed (e.g. etched away) by the plating solution 315 during the plating process (see FIG. 3F). Consequently, there is no need for additional steps to remove the seed layer 309 located on the surface of the photoresist 305. It should be appreciated that according to one embodiment of the present invention seed layer 309 on the surface of photoresist 305 would dissolve in the plating solution even if a voltage were not applied to contacts 313A and 313B.

Figure 3G:
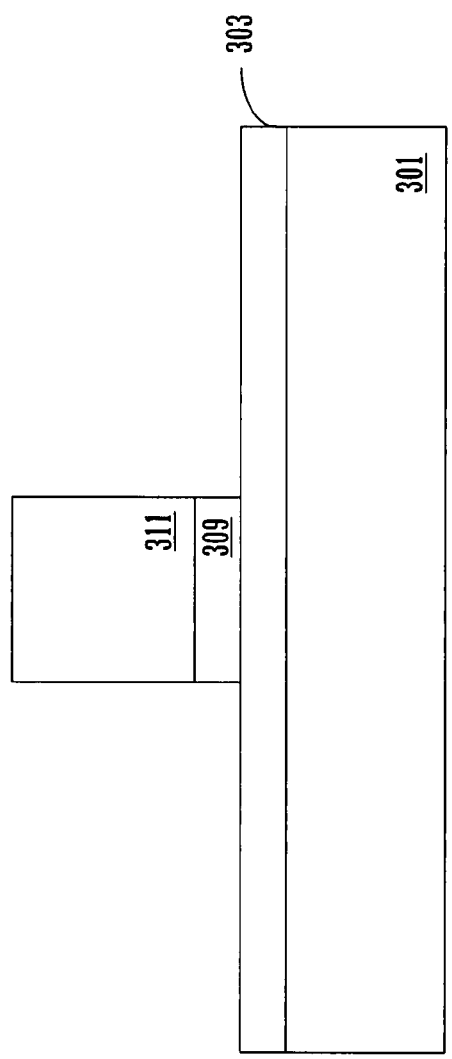
FIG. 3G illustrates photoresist removal in a process for forming a write pole according to one embodiment of the present invention.

FIG. 3G illustrates a wafer cross section resultant from operations that are performed in a process for forming a write pole according to one embodiment of the present invention. FIG. 3G shows the appearance of the thin film structure after the photoresist 305 has been removed.

Figure 3H:
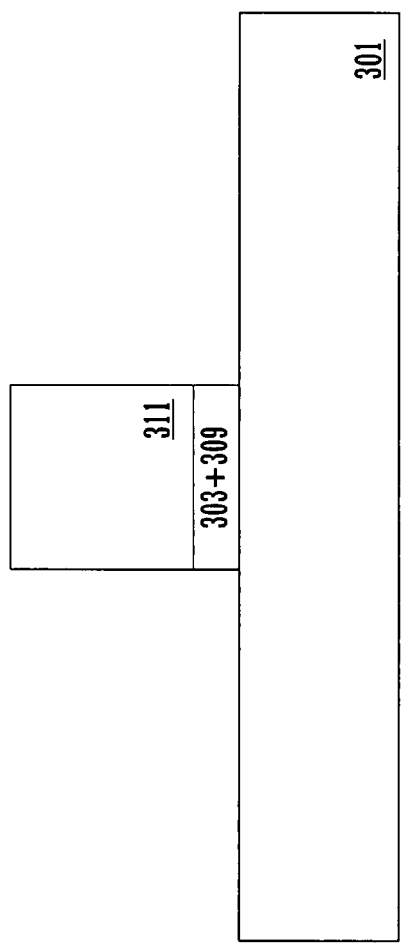
FIG. 3H illustrates thin seed layer removal in a process for forming a write pole according to one embodiment of the present invention.
Figure 31:
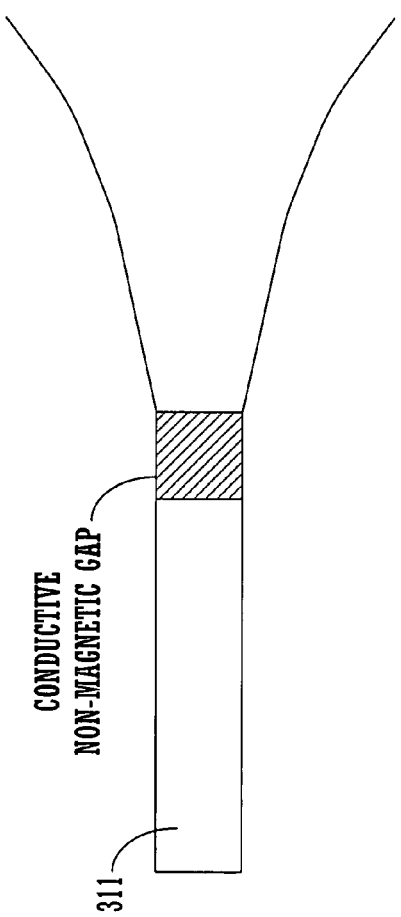

FIG. 3H illustrates a wafer cross section resultant from operations that are performed in a process for forming a write pole according to one embodiment of the present invention. FIG. 3H shows the appearance of the thin film structure after the removal of the portions of the conductive layer 303 that are exposed by the removal of the photoresist. The conductive layer that remains (portions of 303 and seed layer 309) under the pole is a thick high moment conductive layer.

Figure 3J:
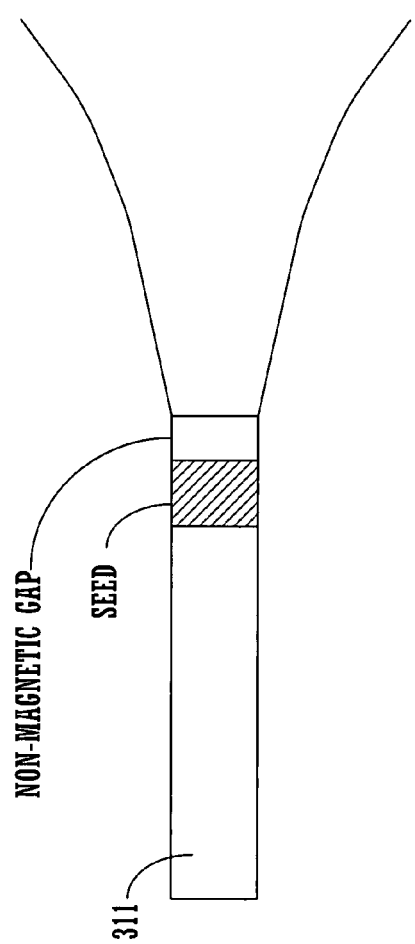
FIG. 3J shows the completed write pole according to one embodiment of the present invention.

FIGS. 3I and 3J shows the completed write pole according to one embodiment of the present invention. FIG. 3I shows a completed write pole that employs a conductive non-magnetic gap layer. It should be appreciated that according to one embodiment a conductive non-magnetic metal gap layer can be used instead of a thin seed layer. FIG. 3J shows a completed write pole that employs a thin seed layer and a non-magnetic metal gap layer.

It should be appreciated that the processes described above allow an increase in the amount of seed (thickness of the seed layer) that may be used while limiting the consumption of the pole tip in read/write head fabrication processes. The increased seed layer thickness and pole tip length translates into improved read/write head performance.

Figure 4:
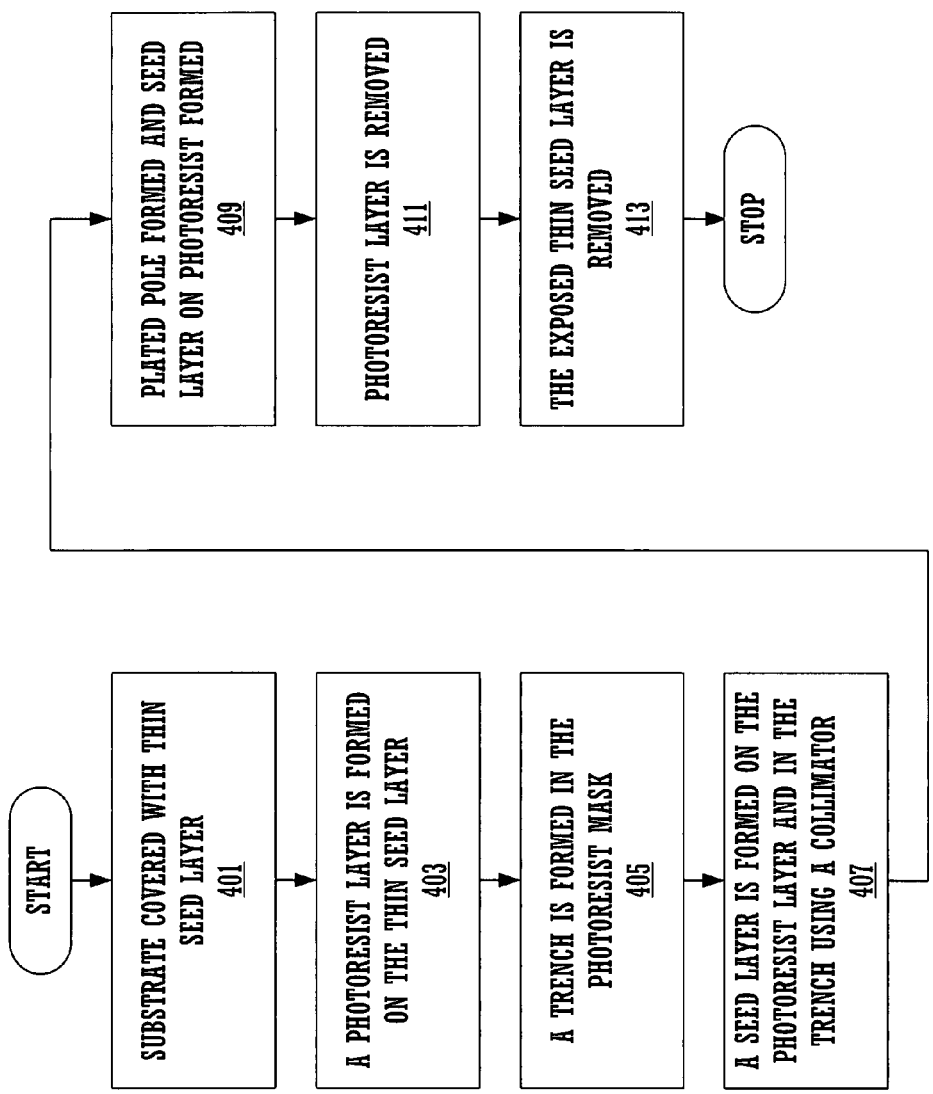
FIG. 4 shows a flowchart of the steps performed in a fabrication process for forming a write pole according to one embodiment of the present invention.

FIG. 4 shows a flowchart of the steps performed in a process for forming a write pole according to one embodiment of the present invention. The steps are described with reference to the FIGS. 3A-3H discussed herein.

At step 401, substrate 301 is covered with a conductive layer (e.g., thin seed layer and non-magnetic metal gap layer or conductive non-magnetic metal gap layer). The conductive layer may be formed by any suitable process for forming the conductive layer.

At step 403, a photoresist layer 305 is formed above the surface of substrate 301 according to one embodiment of the present invention.

At step 405, a space 307 (e.g., trench etc.) is formed by exposing at specified locations into the body of photoresist layer 305. In alternate embodiments, space 307 may be formed by other suitable processes (e.g., etching etc.). Trench 307 is used to shape the structure of the write pole.

At step 407, a thick seed layer 309 is formed in the trench 307 and on the photresist layer using a collimator. In alternate embodiments, other suitable means of forming a seed layer may be employed. According to one embodiment, seed layer 309 comprises a thick high moment seed layer.

At step 409, plated pole 311 is formed by immersing a wafer that includes the structures shown in FIG. 3D in a plating solution and applying a voltage to contacts located at the edges of the substrate 301 as is shown in FIG. 3F. According to one embodiment, seed layer 309 located on the surface of the photoresist is electrically isolated and is removed by the plating solution during the plating process. Seed layer 309 in the trench remains. It should be appreciated that according to one embodiment of the present invention seed layer 309 formed on the surface of the photoresist would dissolve in the plating solution even if electricity were not applied.

At step 411, the photoresist is removed. FIG. 3F shows the appearance of the thin film structure after the photoresist has been removed.

At step 413, the exposed portions of conductive layer 303 are removed. FIG. 3G shows the appearance of the thin film structure after the exposed portions of the conductive layer has been removed.

As noted above with reference to exemplary embodiments thereof, the present invention provides a method for reducing plated pole height loss in the formation of a write pole for a magnetic write head. The method includes forming a conductive layer on a thin film substrate, forming a photoresist layer on the conductive layer, forming a seed layer on the surface of the photoresist layer and in a trench formed in the photoresist layer. Moreover, the method includes plating while applying a voltage to the thin film substrate, where the seed layer is removed and the trench is filled with plating material, removing the photoresist layer, and removing the conductive layer on the thin film substrate.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for forming a write pole for a magnetic write head, said method comprising:

forming a conductive layer on a thin film substrate;

forming a photoresist layer on said conductive layer;

forming a trench in said photoresist layer;

forming a second conductive layer on the surface of said photoresist layer and in said trench wherein said second conductive layer is formed using a collimator;

plating while applying a voltage to said thin film substrate wherein said second conductive layer on said surface of said photoresist layer is removed and said trench is filled with plating material;

removing said photoresist layer; and removing an exposed portion of said conductive layer that is exposed by the removal of said photoresist layer.

2. The method of claim 1, wherein said forming said second conductive layer on said surface of said photoresist layer comprises a deposition of said second conductive layer on said surface of said photoresist layer and in said trench.

3. The method of claim 1, wherein said second conductive layer is a high moment seed layer.

4. The method of claim 1, wherein said second conductive layer on said surface of said photoresist layer is electrically isolated from said thin film substrate.

5. The method of claim 1, wherein said photoresist layer defines a trench window that facilitates the plating of a write pole.

6. The method of claim 1, wherein portions of said second conductive layer that is formed in said trench is not removed during said plating.

7. The method of claim 1, wherein said plating while applying a voltage to said thin film substrate comprises removing portions of said second conductive layer in a plating solution.

8. The method of claim 1, wherein said conductive layer is comprised of either a thin seed layer and a non-magnetic metal gap layer or a non-magnetic metal gap layer.

9. The method of claim 1, wherein said conductive layer is comprised of a thin seed layer and a non-magnetic metal gap layer and said non-magnetic metal gap layer is either non-conductive or conductive.

10. A method for reducing plated pole height loss in the formation of a write pole for a magnetic write head, said method comprising:

forming a first conductive layer on a thin film substrate;

forming a photoresist layer on said first conductive layer;

forming a trench in said photoresist layer;

forming a second conductive layer on the surface of said photoresist layer and on the bottom of said trench, wherein said second conductive layer is formed using a collimator;

plating while applying a voltage to said thin film substrate wherein portions of said second conductive layer formed on said surface of said photoresist layer is removed from said photoresist mask layer and said trench is filled with plating material;

removing said photoresist layer; and removing exposed portions of said first conductive layer that are formed on said thin film substrate.

11. The method of claim 10, wherein said forming said second conductive layer comprises a deposition of said thick seed layer into said trench.

12. The method of claim 10, wherein said second conductive layer is a high moment seed layer.

13. The method of claim 10, wherein said second conductive layer on said surface of said photoresist layer is electrically isolated from said thin film substrate.

14. The method of claim 10, wherein said photoresist mask layer defines a trench window that facilitates said plating of a write pole.

15. The method of claim 10, wherein said first conductive layer is comprised of either a thin seed layer and a non-magnetic metal gap layer or a non-magnetic metal gap layer.

16. The method of claim 10, wherein in said first conductive layer is comprised of a thin seed layer and a metal gap layer and said non-magnetic metal gap layer is either non-conductive or conductive.

17. A method for reducing plated pole height loss in the formation of a write pole for a magnetic write head, said method comprising:

forming a conductive layer on a thin film substrate;

forming a photoresist layer on said conductive layer;

forming a trench in said photoresist layer;

forming a seed layer on the surface of said photoresist layer and on a bottom of said trench wherein sidewalls of said trench comprises portions of said photoresist layer and said bottom of said trench comprises portions of said conductive layer, wherein said seed layer is formed using a collimator;

plating while applying a voltage to said thin film substrate wherein portions of said seed layer that are formed on said photoresist layer are removed and said trench is filled with plating material;

removing said photoresist layer; and removing portions of said conductive layer that are exposed on said thin film substrate.

18. The method of claim 17, wherein said seed layer is a high moment seed layer.

19. The method of claim 17, wherein said seed layer on said surface of said photoresist layer is electrically isolated from said semiconductor substrate.

20. The method of claim 17, wherein said plating while applying a voltage to said thin film substrate comprises removing said seed layer in a plating solution used to form a write pole.

21. The method of claim 17, wherein said conductive layer is comprised of either a thin seed layer and a non-magnetic metal gap layer or a non-magnetic metal gap layer.

22. The method of claim 17, wherein in said conductive layer is comprised of a thin seed layer and a non magnetic metal gap layer and said non-magnetic metal gap layer is either non-conductive or conductive.

* * * * *